Jan. 12, 1932. C. L. SNYDER 1,841,221
CONNECTER DEVICE
Filed Oct. 5, 1931   2 Sheets-Sheet 1
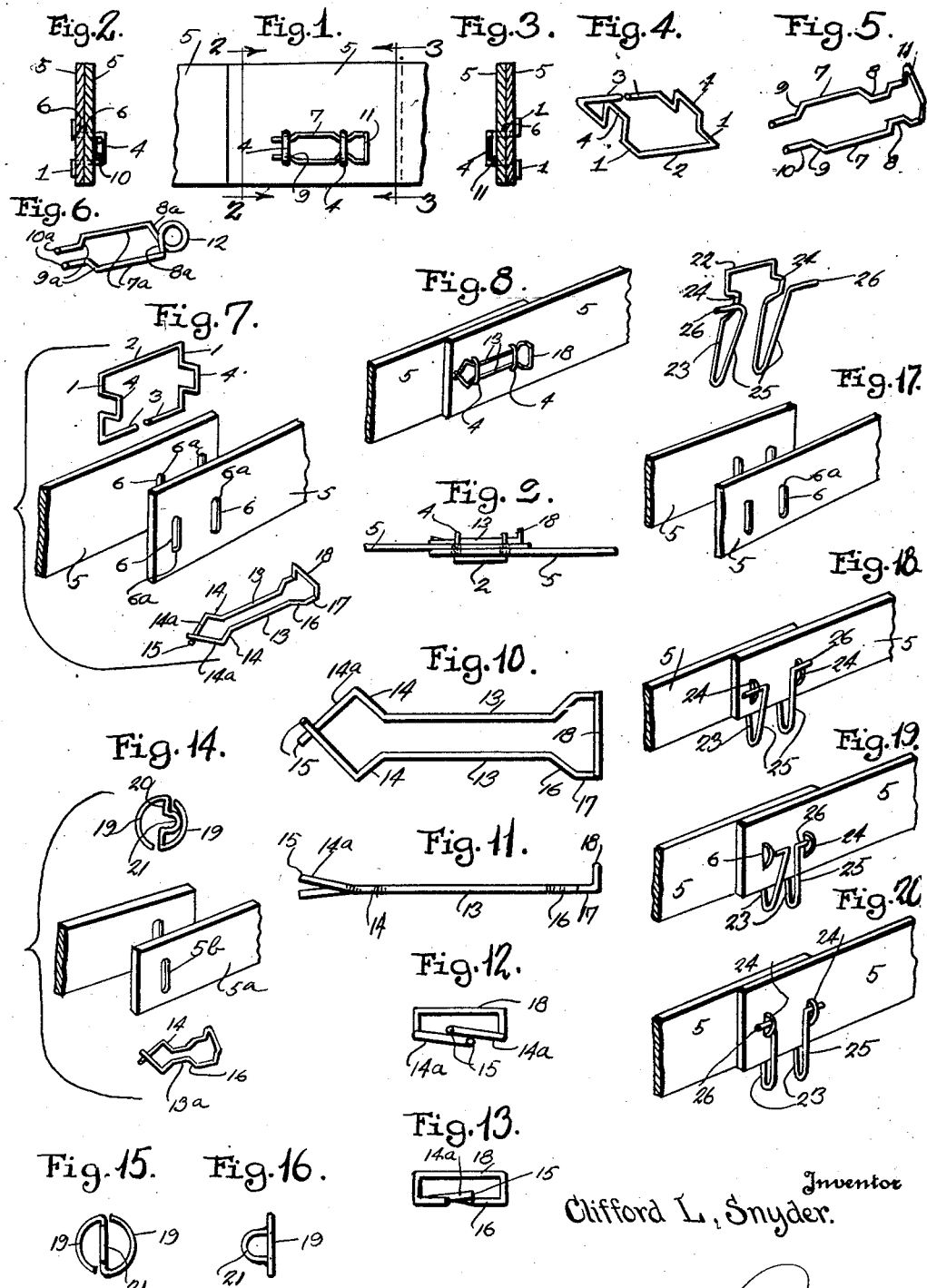
Inventor
Clifford L. Snyder.

Jan. 12, 1932. C. L. SNYDER 1,841,221
CONNECTER DEVICE
Filed Oct. 5, 1931 2 Sheets-Sheet 2
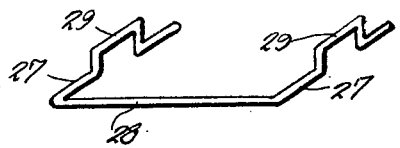
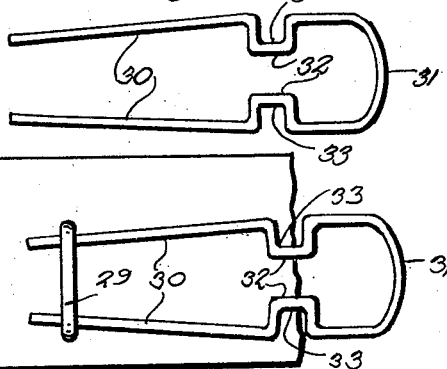
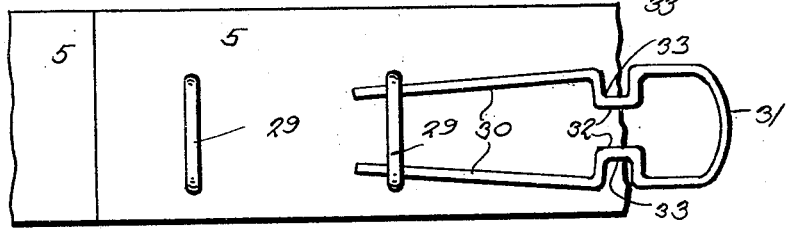
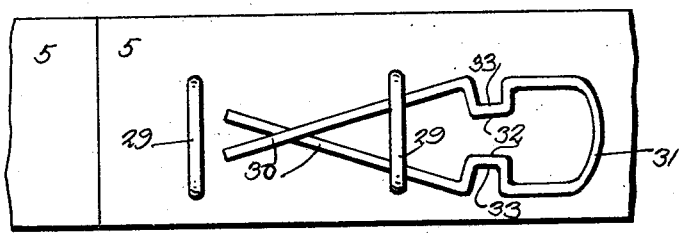
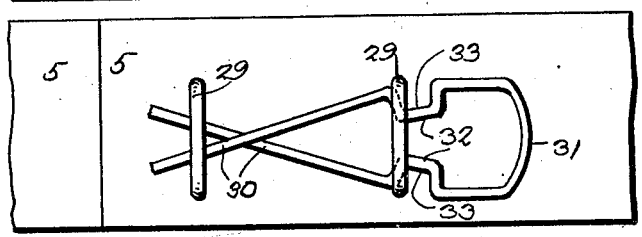
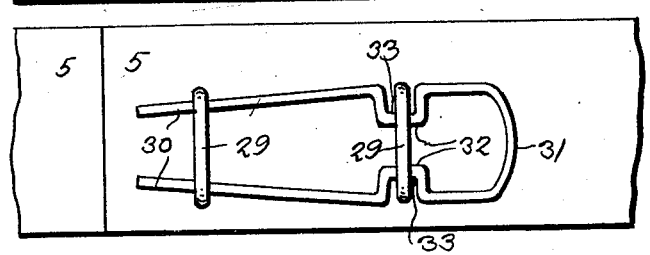
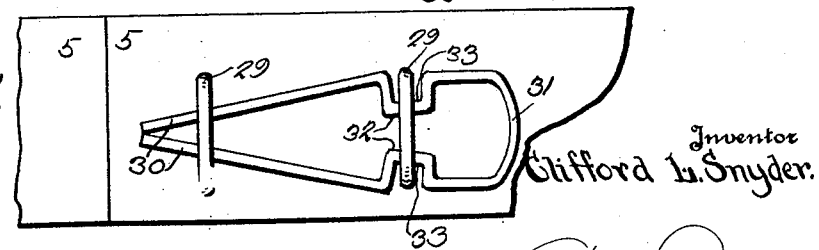
Inventor
Clifford L. Snyder.
By
Attorney Patented Jan. 12, 1932

1,841,221

UNITED STATES PATENT OFFICE

CLIFFORD L. SNYDER, OF DETROIT, MICHIGAN, ASSIGNOR TO EVANS PRODUCTS COMPANY, OF DETROIT, MICHIGAN

CONNECTER DEVICE

Application filed October 5, 1931. Serial No. 567,119.

This invention relates to certain new and useful improvements in connecter devices.

The primary object of the invention is to provide a connecter device for joining two members together, more particularly the ends of band iron wherein overlapping ends of the band iron are provided with registering openings through which a loop member is extended with a retainer key interlockingly engaged with the projecting closed ends of the loops for retaining the inter-engaged parts of the connecting device assembled with the overlapped ends of the band secured together thereby.

A further object of the invention is to provide a fastening clip for band ends with a looped wire device perpendicularly extended through registering openings in the overlapping ends of the band with a retainer key engaged with the projecting looped ends of the wire member for retaining the band ends in assembled relation.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a fragmentary plan view showing overlapped band ends secured together by the improved connecter device;

Figure 2 is a cross-sectional view taken on line 2—2 of Figure 1;

Figure 3 is a cross-sectional view taken on line 3—3 of Figure 1;

Figure 4 is a perspective view of one part of the connecter device in the form of a wire frame having loop projections adapted to be extended through registering openings in the overlapped ends of the band;

Figure 5 is a perspective view of the wire retaining key adapted to be engaged with the looped portions of the wire frame with the closed end of the retainer key offset to provide a finger grip;

Figure 6 is a perspective view of another form of retainer key showing a looped or ring portion at the closed end of the key;

Figure 7 shows perspective views of the looped wire frame, overlapping band ends, and another form of retainer key;

Figure 8 is a perspective view showing the parts of Figure 7 in assembled relation;

Figure 9 is an edge elevational view of the band joint;

Figure 10 is a top plan view of the retainer key shown in Figure 7 illustrating the opposed V-angle at the outer end of each side leg of the retainer key;

Figure 11 is an edge elevational view of the retainer key;

Figure 12 is an end elevational view of the open end of the retainer key;

Figure 13 is an end elevational view of the closed end of the retainer key;

Figure 14 shows perspective views of a looped wire frame, overlapping band ends and retainer key with the wire frame and retainer key of modified form;

Figure 15 is a top plan view of the looped wire frame shown in Figure 14;

Figure 16 is a side elevational view of the wire frame shown in Figure 15;

Figure 17 shows perspective views of a combined looped wire frame and retainer key, and overlapping band ends to be connected thereby;

Figure 18 is a perspective view showing the combined wire frame and retainer key initially engaged with the overlapping band ends by having the looped portions of the wire frame extended through registering openings in the band ends;

Figure 19 is a perspective view, similar to Figure 18, showing the legs of the retainer key resiliently moved toward each other to be placed in alinement with the projecting loop portions of the wire frame;

Figure 20 is a perspective view, similar to Figure 19, with the ends of the legs of the retainer key engaged with the looped portions of the wire frame;

Figure 21 is a perspective view of another form of wire frame with loop projections at opposite sides thereof;

Figure 22 is a top plan view of another form of retainer key for association with the looped frame shown in Figure 21;

Figure 23 is a top plan view of overlapping band ends showing the legs of the retainer key moved toward each other for entering the first loop of the wire frame member;

Figure 24 is a top plan view, similar to Figure 23 showing the outer ends of the side legs of the retainer key moved into crossed relation to enter the second loop of the wire frame to position the notches in the side legs of the key adjacent the closed end thereof for engagement with the first loop of the wire frame;

Figure 25 is a top plan view, similar to Figure 24 showing the crossed ends of the side leg of the retainer key projected through the second loop with the notched portion of the side leg registering with the first loop;

Figure 26 is a top plan view, similar to Figure 25 showing the side legs of the retainer key extended for interlocking engagement with the loops of the frame;

Figure 27 is a top plan view, similar to Figure 26 showing the notched portions of the side legs of the retainer key interlockingly engaged with the first loop of the wire frame when the outer ends of the side legs of the key are moved into contacting engagement; and Figure 28 is a side elevational view of the retainer key shown in Figure 22.

It has heretofore been the usual practice to connect band ends by the use of rivets, but when it is desired to separate or loosen the ends, the rivets are destroyed and the band ends are damaged, but with the present device a separable connecter may be disengaged from the band ends without injury thereto and re-used. In the present invention, band ends are provided with registering slots that have rounded ends and the wire frame that comprises looped portions to be extended through the registering slots is constructed of strong tempered steel to reduce shearing action on the connecter device resulting in the band ends being connected together in a more efficient manner and permitting easy separation thereof.

In the form of the invention illustrated in Figures 1 to 5, the connecter device includes a wire frame of rectangular formation bent from a single strand of wire, that is preferably round in cross-section and of highly tempered steel, if desired, the frame comprising opposite sides 1 with a closed connecting side 2 with the section thereof opposite the side 2 formed of the ends 3 of the wire strand as illustrated in Figure 4, providing a substantially flat base portion for flat contact with a joint formed by overlapping band ends to be presently described. The opposite sides 1 of the wire frame are each provided with an offset perpendicular loop portion 4 projecting from one side of the wire frame and out of the plane of the base portion. The overlapping band ends 5 are each provided with a pair of spaced slots with the respective slots of the band ends registering when the band ends are in overlapped relation, the wire frame illustrated in Figure 4 being engaged with the outer face of one band end with the loop portions 4 thereof projecting through the registering slots as shown in Figures 1 to 3.

The loop portions 4 of the wire frame project outwardly of the outer band ends as illustrated in Figures 2 and 3 and a retainer key as shown in Figure 5 is engaged with the projecting portions of the loops in an interlocking manner for connecting the two parts of the device together and for securing the overlapping band ends in assembled relation. The retainer key is formed of a single strand of wire bent into U-shape to provide side legs 7, each leg having an opposed inwardly directed notched portion 8 adjacent the closed end of the key while an inwardly directed angular shoulder 9 at the outer end of each side leg 7 of the key provides adjacently positioned terminal sections 10. The closed end 11 of the key is perpendicularly offset to provide a finger grip in a plane laterally of the overlapped ends of the band. To engage the retainer key with the loop portions 4 of the wire frame, the terminal ends 10 of the key are moved toward each other for passage through the projecting portions of the loops 4 to position the notched portions 8 in engagement with the first loop and the shoulders 9 in engagement with the second loop as illustrated in Figure 1, the retainer key being of a resilient character for maintaining the position shown in Figure 1 relative to the wire frame for retaining the overlapping band ends in assembled relation. The key is disengaged from the wire frame by moving the terminal ends 10 of the side legs of the key toward each other and at which time the key may be readily withdrawn from the loop portions 4 of the wire frame, the latter then disengaged from the registering slots 6 in the band ends and the bands separated.

Another form of retainer key is illustrated in Figure 6 and is of the general character shown in Figure 5, comprising side legs 7a with angle shoulders 9a adjacent the terminal ends 10a, angle shoulders 8a being provided adjacent the closed end of the key with the wire section forming the closed end bent into a circular loop 12. The shoulders 8a and 9a of the key shown in Figure 6 are engageable with the loop portions 4 of the wire frame.

Another form of retainer key is illustrated in Figures 7 to 13, the wire frame illustrated in detail in Figure 7, being the same as that shown in Figure 4 and designated by similar reference characters. The band ends 5 are illustrated in Figure 7, in spaced relation to more clearly illustrate the spaced slots 6 that have curved or rounded end walls 6a. The retainer key as illustrated in said figures embodies side leg portions 13 arranged in closer relationship than the side leg portions 7 of the retainer key as illustrated in Figure 5, the outer end of the key being angularly bent in each leg thereof in an outward direction to provide substantially V-portions defining shoulders 14 and 14a with the terminal ends 15 of the V-shaped portions of the legs overlapping in normal position as illustrated in Figures 7, 8 and 10, the side leg portions 13 being normally disposed in parallel relation as illustrated. The closed end of the retainer key at the inner ends of the side leg portions 13 are angularly bent in an outward direction to provide shoulders 16 terminating in parallel portions 17 and a perpendicularly offset finger grip 18 forming the cross-bar of the closed end of the retainer key. In assembling the band ends illustrated in Figures 7 to 13, the respective slotted openings 6 are alined and the loops 4 upon the side portion 1 of the wire frame are extended through the registering openings 6 to project laterally of the overlapping band ends as illustrated in Figures 8 and 9. The shouldered ends 14 and 14a are then moved toward each other for passage through the first loop 4 and they are similarly compressed for passing through the second loop to assume the position shown in Figure 8 with the shoulders 14 and 16 engaged with the loops 4 of the wire frame as illustrated. The adjacently positioned side leg sections 13 of the retainer key are disposed between the two loops 4 and the retainer key is maintained in engagement with the loops 4 by the angle shoulders 14 and 16.

In the form of invention illustrated in Figures 14 to 16, the retainer key is similar to the form of key illustrated in Figures 7 to 13 except that the side leg sections 13 thereof are of reduced length while the overlapping band ends are provided with single registering slotted openings for the reception of a single loop member carried by a wire frame. The wire frame carrying the single loop is formed of a single strand of wire having opposite ends thereof bent into arcuate formation as at 19, disposed in the same plane and combining to form a substantially circular frame with the intermediate portion of the wire strand extending transversely of the arcuate end portions as at 20 with a perpendicularly extending loop 21 arranged intermediate the ends thereof. The band ends 5a are each provided with a single slotted opening 5b that when mated receive the loop 19 of the wire frame which projects from one side of the mating band ends, the key illustrated in Figure 14 as previously stated being of similar construction to the key shown in Figures 7 to 13 except that the side leg portions 13a are of reduced length to bring the shoulders 14 and 16 into closer relationship for cooperation with the single loop 21.

A combined wire frame carrying loop and retainer key is illustrated in Figures 17 to 20. The combined loop carrying frame and retainer key as illustrated in Figure 17 is formed of a single strand of wire bent intermediate its ends to provide a cross bar 22 and parallel side legs 23 that carry perpendicular offset loops 24 intermediate their ends. The side legs 23 are reversely bent as at 25 to overlie and be spaced from the side leg portions 23 with the terminal ends of the reversely bent portions 25 bent outwardly to provide retainer keys 26. The band ends 5 are of the same construction as illustrated in Figures 1 and 7, being provided with pairs of spaced slotted openings 6 having rounded ends 6a. The band ends 5 are assembled as illustrated in Figure 18 with the loop portions 24 projected through the registering openings 6 with the leg sections 25 overlying the opposite side or face of the band end. The leg sections 25 are then moved toward each other as shown in Figure 19 to position the key ends 25 there in alinement with the loops 24 and when pressure on the leg ends 25 is relieved, the key ends 26 then move into the projecting portions of the loops 24 as shown in Figure 20.

Another form of loop frame and retainer key are illustrated in Figures 21 to 28 wherein double loops are provided, but the retainer key is interlockingly engaged with only one loop, the loop carrying wire frame as illustrated in Figure 21 being of U-shape and embodying side legs 27 connected by a cross-bar 28. Each side leg 27 carries a perpendicularly extending loop portion 29 intermediate its ends that is extended through registering slotted openings provided in overlapping band ends 5 as illustrated, similar to the band ends illustrated in Figures 17 to 20. The retainer key is of substantially U-shape with inclined side legs 30 connected at one end by a cross-bar 31 while each side leg 30 adjacent the closed end is notched inwardly as at 32 to provide socket portions 33. The manner of attaching the retainer key to the looped portions of the wire frame is illustrated in Figures 23 to 27, the spaced ends of the side legs 30 being moved toward each other for insertion through the first loop 29, pressure upon the closed end of the key causing the legs 30 to move into crossed relation as shown in Figures 24 and 25 for passage through the second loop and to position the sockets 33 of the notches 32 in position for enclosing opposite sides of the first loop 29 as shown in Figure 26, the key being securely retained in position even though the free ends of the legs should be moved into abutting engagement as illustrated in Figure 27. The closed end of the retainer key is upset as illustrated in Figure 28 to facilitate application and removal thereof in association with the loops 29 of the wire frame member.

From the above detailed description of the invention, it is believed that the several forms of construction and methods of operation will at once be apparent, it being noted that in each form of the invention, a wire member is disposed perpendicularly to the ends of the bands, the wire member embodying either a single or double loop projected through registering slotted openings in the band ends with a retainer key associated with the projecting ends of the loops at one side of the band ends. Also, by the provision of round wire that may be highly tempered and rounding of the ends of the slots in the band ends, there is a strong tendency to prevent any shearing action or tearing of the band iron at the slotted portions and upon removal of the retainer key and displacement of the loop portions from the band end slots, the band ends are readily separated without damage thereto.

While there are herein shown and described the preferred embodiments of the present invention, it is nevertheless to be understood that minor changes may be made therein without departing from the spirit and scope of the invention as claimed.

I claim:—

1. A device for securing a pair of apertured band ends in overlapped relation with the corresponding apertures in said ends in register, said device including a substantially flat base adapted to engage one side of the joint formed by such ends, loop means projecting from said base for passage through the registering openings and resilient means for detachably locking said loop means in position in said apertures, said locking means including relatively movable members normally passing through the loop means on the opposite side of said joint.

2. Means for securing a pair of apertured band ends in overlapped relation with the corresponding apertures in said ends in register, said means including a substantially flat base adapted to engage one side of the joint formed by such ends, a loop projecting from said base for passage through the registering openings and resilient means for detachably locking said loop in position in said apertures, said locking means including relatively movable members normally passing through the loop on the opposite side of said joint.

3. Means for securing a pair of apertured band ends in overlapped relation with the corresponding apertures in said ends in register, said means including a substantially flat wire frame adapted to engage one side of the joint formed by such ends and having side legs with a loop projecting from each leg intermediate the ends thereof for passage through the registering openings and resilient means for detachably locking said loops in position in said apertures, said locking means including two relatively movable legs having portions normally passing through the loops on the opposite side of said joint.

4. The combination with overlapped band ends having registering openings therein, of a connecter device including a rectangular wire frame having a perpendicular loop projection on each of two opposite sides to extend through the registering openings and a retainer key having side legs with a shoulder adjacent the inner end of each leg for abutting engagement with one of the loops at the side of the overlapped band ends opposite the wire frame.

5. The combination with overlapped band ends having registering openings therein, of a connecter device including a rectangular wire frame having a perpendicular loop projection on each of two opposite sides to extend through the registering openings, and a retainer key having side legs with a shoulder adjacent each end of each leg for interlocking engagement with the loops.

6. The combination with overlapped band ends having registering openings therein, of a connecter device including a rectangular wire frame having a perpendicular loop projection on each of two opposite sides to extend through the registering openings, a retainer key having side legs with a shoulder adjacent each end of each leg for interlocking engagement with the loops, and an offset finger grip at one end of the retainer key.

7. The combination with overlapped band ends having registering openings therein, of a connecter device including a wire frame having a perpendicular loop projection on each of two opposite sides to extend through the registering openings, a retainer key having side legs with a shoulder adjacent each end of each leg for interlocking engagement with the loops, the ends of the band slots being rounded, and said wire loops being round in cross-section and engaged with the slot ends to prevent shearing of the slot walls.

8. The combination with overlapped band ends having registering openings therein, of a connecter device including a rectangular wire frame having a perpendicular loop projection on each of two opposite sides to extend through the registering openings, a retainer key having side legs with a shoulder adjacent each end of each leg for interlocking engagement with the loops, the shoulders of the legs being disposed at the outer sides of the loops and adjacent the ends of the legs.

9. The combination with overlapping band ends having registering openings therein, of a connecter device including a rectangular wire frame having a perpendicular loop projection on each of two opposite sides to extend through the registering openings, a retainer key having side legs with a shoulder adjacent each end of each leg for interlocking engagment with the loops, the shoulders of the legs being disposed at the outer sides of the loops adjacent the ends of the legs, and the free ends of the legs being in opposite angle V-form.

10. A connecter device for band ends wherein each band end is slotted with the slots registering when the band ends are in overlapped relation, the connecter device including a wire strand bent to U-shape, to provide side legs, a perpendicular loop carried by each leg to be projected through the slots, the outer ends of the legs being return bent with an angularly directed finger at the terminal end of each return bent portion adjacent the loops to be received in an associated loop.

11. A connecter device for band ends wherein each band end is slotted with the slots registering when the band ends are in overlapped relation, the connecter device including a wire frame having side legs with a perpendicular loop projecting from each side leg to be extended through the band slots, and a retainer key engageable with the loops and formed of a wire strand of U-shape providing side legs with inwardly directed side notches in the legs adjacent the closed end of the retainer key.

12. A connecter device for band ends wherein each band end is slotted with the slots registering when the band ends are in overlapped relation, the connecter device including a wire frame having side legs with a perpendicular loop projecting from each side leg to be extended through the band slots, and a retainer key engageable with the loops and formed of a wire strand of U-shape providing side legs with inwardly directed side notches in the legs adjacent the closed end of the retainer key, the side legs being inclined toward each other and the leg notches being of a depth relative to the loops to necessitate crossing of the ends of the legs when the retainer key is being engaged with and disengaged from the loops.

13. A device for securing a pair of apertured band ends in overlapped relation with the corresponding apertures in said ends in register, said device including a substantially flat base adapted to engage one side of the joint formed by such ends, loop means projecting from said base for passage through the registering openings and resilient means for detachably locking said loop means in position in said apertures, said locking means including relatively movable members normally passing through the loop means on the opposite side of said joint and interlockingly engaged with said loop means.

In testimony whereof I affix my signature.

CLIFFORD L. SNYDER.